United States Patent [19]

Kobayashi et al.

[11] Patent Number: 5,722,294
[45] Date of Patent: Mar. 3, 1998

[54] SEAL MEMBER FOR USE IN BALL SCREW APPARATUS

[75] Inventors: Shigeharu Kobayashi, Maebashi; Mitsuji Kanai, Gunma, both of Japan

[73] Assignee: NSK Ltd., Tokyo, Japan

[21] Appl. No.: 559,272

[22] Filed: Nov. 15, 1995

[30] Foreign Application Priority Data

Nov. 15, 1994 [JP] Japan .................. 6-280741

[51] Int. Cl.$^6$ .................. F16H 25/22
[52] U.S. Cl. .................. 74/424.8 NA; 74/459; 277/197; 277/221
[58] Field of Search .................. 74/89.15, 424.8 R, 74/424.8 NA, 459; 277/31, 192, 197, 218, 220, 221

[56] References Cited

U.S. PATENT DOCUMENTS

| | | | |
|---|---|---|---|
| 2,397,753 | 4/1946 | Sale | 277/221 X |
| 2,486,928 | 11/1949 | Cole | 277/218 X |
| 4,533,149 | 8/1985 | Vater et al. | 277/221 |
| 5,178,029 | 1/1993 | Klinkenberg | 74/424.8 R |

FOREIGN PATENT DOCUMENTS 6-17898   1/1994   Japan .................. 74/424.8 NA

*Primary Examiner*—Richard M. Lorence
*Attorney, Agent, or Firm*—Sughrue, Mion, Zinn,Macpeak & Seas, PLLC

[57] ABSTRACT

In a ball screw apparatus providing a screw shaft, a ball screw nut and a plurality of balls, a seal member is formed of a ring which is fitted into a large-diameter portion of the ball screw nut and a ridge which engages the screw groove of the screw shaft with an inner circumference of the seal member. The ring is formed of first and second segments, each of the first and second segments including a connecting projection and a connecting recess at ends, respectively, the connecting projection and the connecting recess of the first segment being capable of engaging the connecting recess and the connecting projection of the second segment, respectively. The seal member has an anti-slip device for mounting the seal member in the ball screw nut in a short time regardless of the length of the screw shaft and the shape of its end portions and, what is more, cutting and other special operations are unnecessary and there is a great latitude in the selection of materials for the seal member, which therefore can be manufactured at low cost.

15 Claims, 8 Drawing Sheets

SEAL MEMBER FOR USE IN BALL SCREW APPARATUS

BACKGROUND OF THE INVENTION

The present invention relates to an improvement of dustproof seal members which are mounted in ball screw nuts.

Figure 24A:
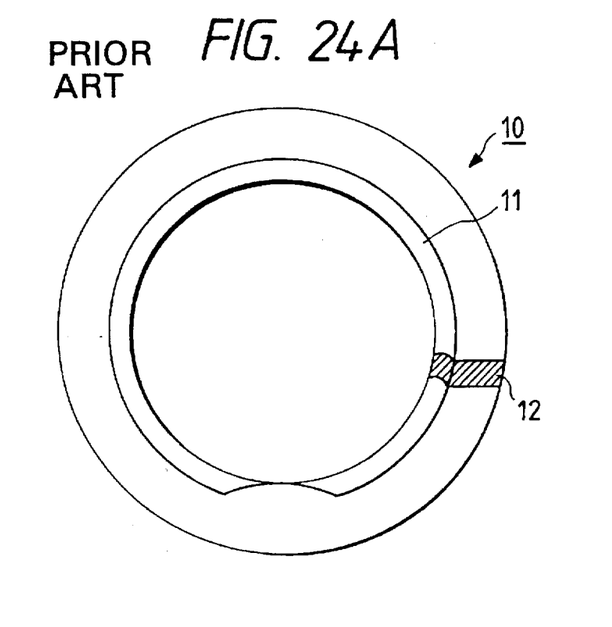
FIG. 24A is a front view showing a conventional seal member for use in ball screw apparatus.
Figure 24B:
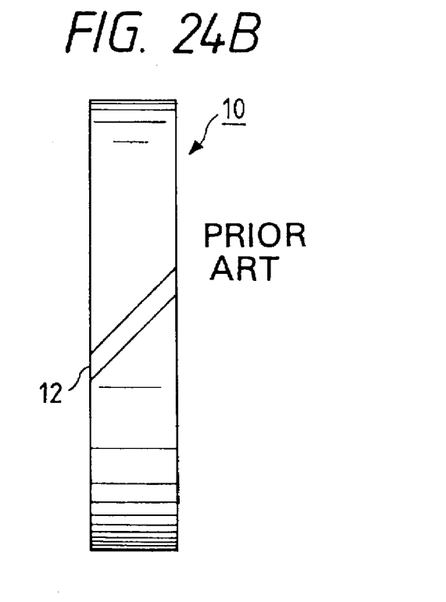
FIG. 24B is a side view of FIG. 24A.
Figure 25:
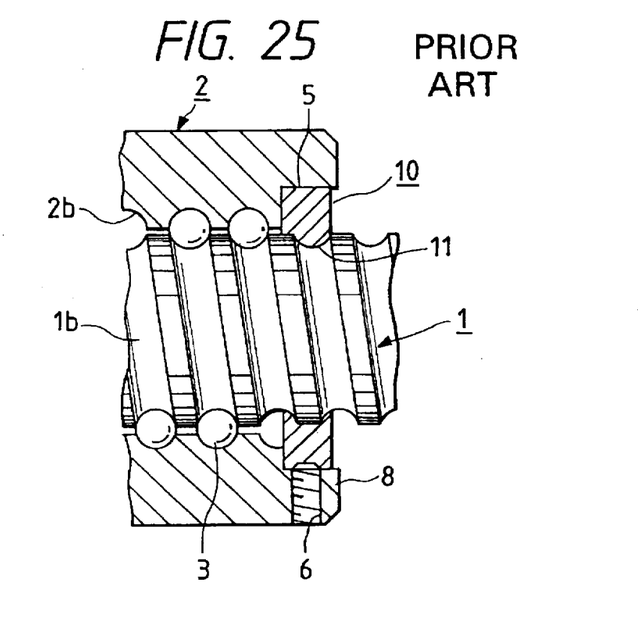
FIG. 25 is a sectional view showing an assemble when the conventional seal member is mounted in a ball screw apparatus.

A problem with ball screws which are commonly used in machining tools is that if foreign materials such as cutting chips and oils enter into a nut by adhering to a screw shaft during screw operation, then balls or the surfaces of screw grooves serving as rolling surfaces wear abnormally or the screw itself functions so poorly that the life of the ball screw is reduced to occasional damage. A common practice for preventing this problem is to mount dustproof seal members in ball screw nuts. A typical example of the conventional seal member for use in ball screw units is shown in FIGS. 24A, 24B and 25. The seal member 10 is generally a ring for being mounted in a ball screw apparatus that includes a screw shaft 1 having a spiral screw groove 1b on the outer circumference and a ball screw nut 2 having a screw groove 2b on the inner circumference in correspondence to the groove 1b, the shaft 1 and the nut 2 being in threadable engagement via a plurality of balls 3 rolling in a helical space formed between the grooves 1b and 2b. The seal member 10 is fitted in the large-diameter portion 5 of the nut 2 which is formed at either end of its opening. The inner circumference of the seal member 10 is provided with a helical ridge 11 that engages the groove 1b on the shaft 1. The circumferential surface of the large-diameter portion 5 of the nut 2 is provided with one or both radial threaded holes 6 that are open on its outer circumference. After the annular seal member 10 is fitted into the large-diameter portion 5 of the nut 2, setscrews 8 in threadable engagement with the holes 6 are tightened such that the seal member 10 is fixed in both a circumferential and an axial directions.

Figure 23A:
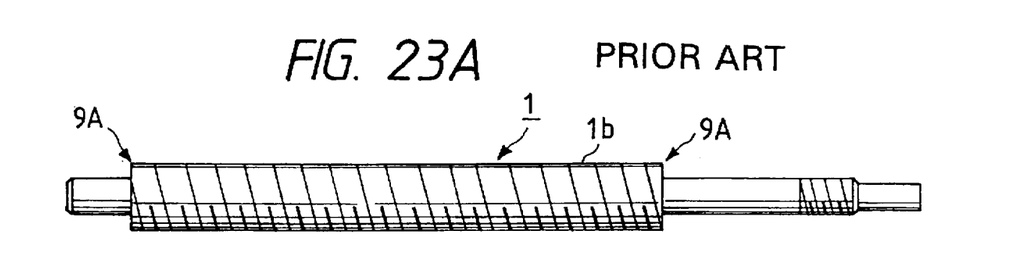
FIG. 23A is a side view of a ball screw shaft having both end portions cut perpendicularly to the axis.
Figure 23B:
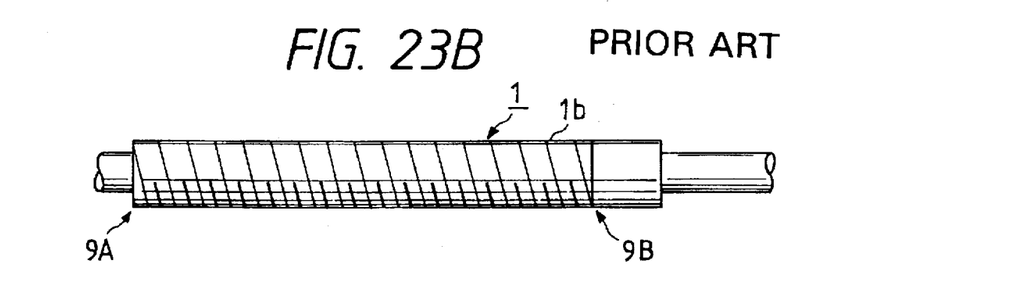
FIG. 23B is a side view of a ball screw shaft having a perpendicularly cut end portion at one end and a rising cut end portion at the other end.

When mounting the conventional seal member 10 in the ball screw nut 2 which is previously set in threadable engagement with the screw shaft 1 via the balls 3, two different mounting operations are used depending on the shape of either end of the shaft 1. First, if one or both end portions 9A of the shaft 1 are cut perpendicularly to the axis of the shaft as shown in FIGS. 23A and 23B, the seal member 10 is brought into threadable engagement with the perpendicularly cut end portion 9A by engaging the ridge 11 with the screw groove 1b on the shaft 1. Then, the seal member 10 is turned helically so that it is advanced to the position of the nut 2 where the seal member 10 can be fitted into the large-diameter portion 5 at an end of the nut 2. Further, the seal member 10 is fixed by tightening the setscrew 8.

Figure 23C:
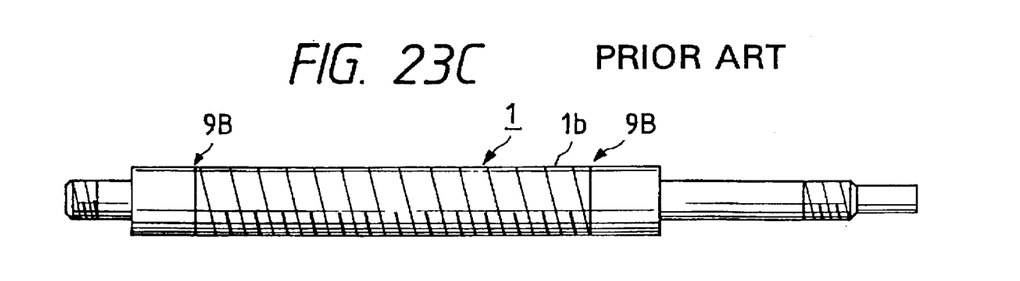
FIG. 23C is a side view showing a ball screw shaft having rising cut end portions at both ends.

On the other hand, if the shaft 1 has a rising cut end portion 9B at one or both ends as shown in FIGS. 23B and 23C, the ridge 11 of the seal member 10 cannot by itself be brought into engagement with the groove 1b on the shaft 1. In this case, a slit 12 is cut obliquely at a portion of the annular seal member 10 as shown in FIGS. 24A and 24B. Since the seal member 10 is elastic, a diameter of the seal member 10 can increase by twisting at the slit 12 to bring the ridge 11 into engagement with the groove 1b on the shaft 1 which is the closest to the nut 2. Then, the seal member 10 is fitted into the large-diameter portion 5 of the nut 2 and fixed by the setscrew 8.

However, the above-described mounting operations of the conventional seal member 10 have inherent problems therein. In the case where it is first brought into engagement with the perpendicularly cut end portion 9A of the screw shaft 1, the mounting operation is quite time-consuming if the shaft is long because it takes a considerable time to advance the seal member to the position of the nut 2 by helical turning.

In addition, a problem with the case of mounting the seal member 10 by bringing it into engagement with the rising cut end portion 9B of the screw shaft is that it is time-consuming and costly to cut a slit in the seal member. In addition, this mounting operation requires that the seal member must be made of an elastic material and it is not applicable if the seal member is made of rigid plastics and the like.

SUMMARY OF THE INVENTION

The present invention has been accomplished under conventional circumstances and has as an object providing a low-cost seal member for use in ball screw apparatus which is formed of a ring divided circumferentially into a plurality of members that are detachably engageable with one another. Having this structural feature, the seal member of the present invention can be mounted in a ball screw apparatus in a short time regardless of the length of the screw shaft and the shape of its end portions and, what is more, cutting and other special operations are unnecessary and there is a great latitude in the selection of materials for the seal member.

The above-stated object of the present invention can be attained by a seal member for use in a ball screw apparatus providing a screw shaft having a helical screw groove on the outer circumference, a ball screw nut having a screw groove on the inner circumference that corresponds to the screw groove on the screw shaft, and a plurality of balls that roll within a helical space formed between the screw grooves. The seal member is a ring that is to be fitted into the large-diameter portion of the ball screw nut which is formed at an end of the opening of the nut, wherein the inner circumference of the seal member having a helical ridge that is to engage the screw groove on the ball screw nut. The ring is formed of two or more circumferential segments, the ends of each segment being provided with a circumferential connecting projection or recess, the connecting projection being capable of engagement with the connecting recess provided in another segment whereas the connecting recess is capable of engagement with the connecting projection provided on the another segment. The connecting recess and projection of any two segments in engagement are brought into engagement with each other by an anti-slip device.

The seal member of the present invention is formed by connecting a plurality of circumferential segments of a ring into an annular shape. The segments are individually carried direct to the vicinity of the ball screw nut in threadable engagement with the screw shaft. The individual segments are placed on both sides of the screw shaft to hold it and the helical ridge on the inner circumference of each segment is brought into engagement with the screw groove on the shaft while, at the same time, the connecting projection of one segment is fitted into the mating recess of an adjacent segment and the thus connected segments are secured by the suitable anti-slip device to form a complete ring.

Thereafter, the annular seal member is turned about the screw shaft by a small amount until it is fitted into the large-diameter portion of the ball screw nut at either end, where it is secured to the nut. The operational efficiency of mounting the seal member of the present invention is not affected by the shape of both ends of the screw shaft or its length, and the mounting operation can be completed within a very short time. What is more, the seal member of the present invention can be mounted without cutting a slit in it or forming it of an elastic material so that it can be opened by twisting at the slit.

DETAILED DESCRIPTION OF THE PREFERRED EMBODIMENTS

Embodiments of the present invention will now be described with reference to accompanying drawings, in which the parts or components that are identical or equivalent to those used in the conventional case are identified by like numerals.

Figure 5:
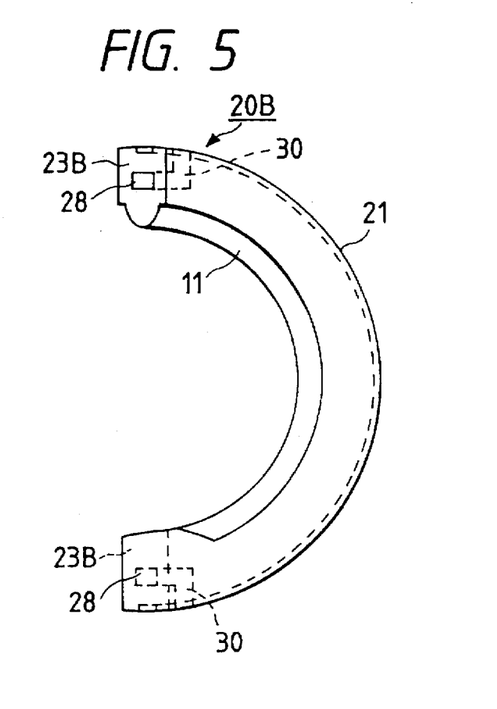
FIG. 5 is a front view showing the other segment of the seal member according to the first embodiment of the present invention.
Figure 6:
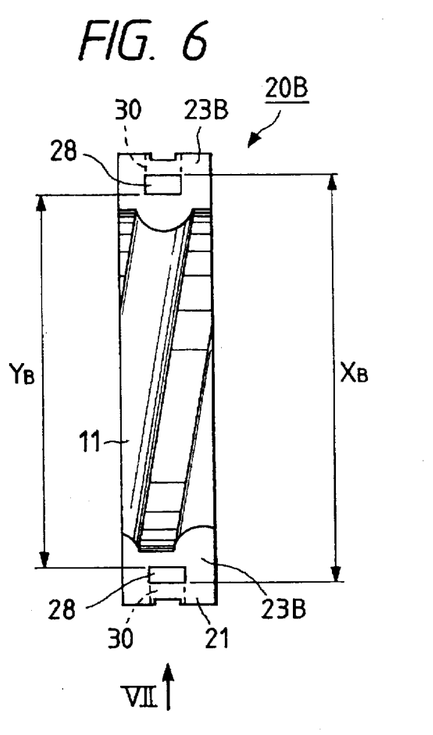
FIG. 6 is a side view of FIG. 5.
Figure 7:
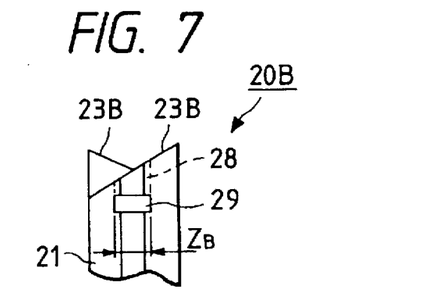
FIG. 7 is a partial view of FIG. 6 as being taken in the direction indicated by arrow VII.
Figure 8:
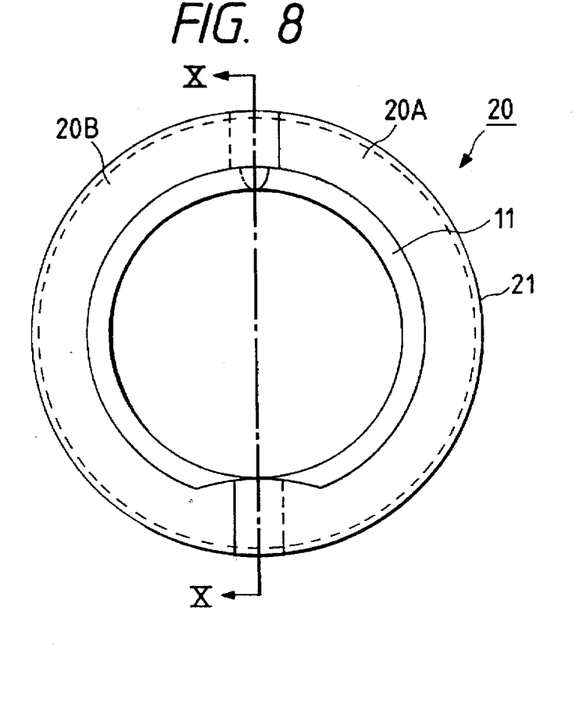
FIG. 8 is a front view showing the assembled seal member according to the first embodiment of the present invention.
Figure 9:
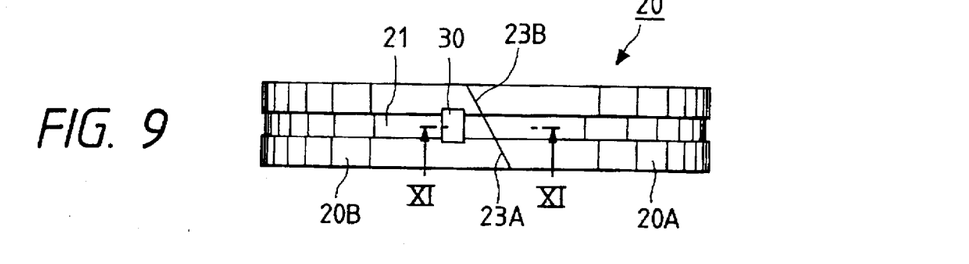
FIG. 9 is a top view of FIG. 8.
Figure 10:
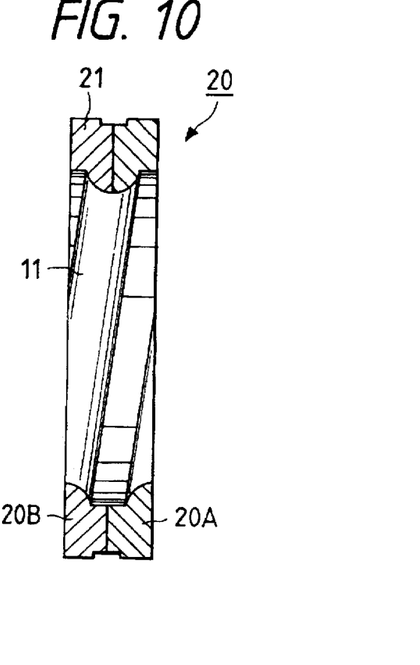
FIG. 10 is a section X—X of FIG. 8.

FIGS. 1–10 show a first embodiment of a seal member of the present invention; FIGS. 1–4 show one of two semi-circular segments of the seal member; FIGS. 5–7 show the other semi-circular segment; and FIGS. 8–10 show the two segments connected together in a ring form.

Figure 1:
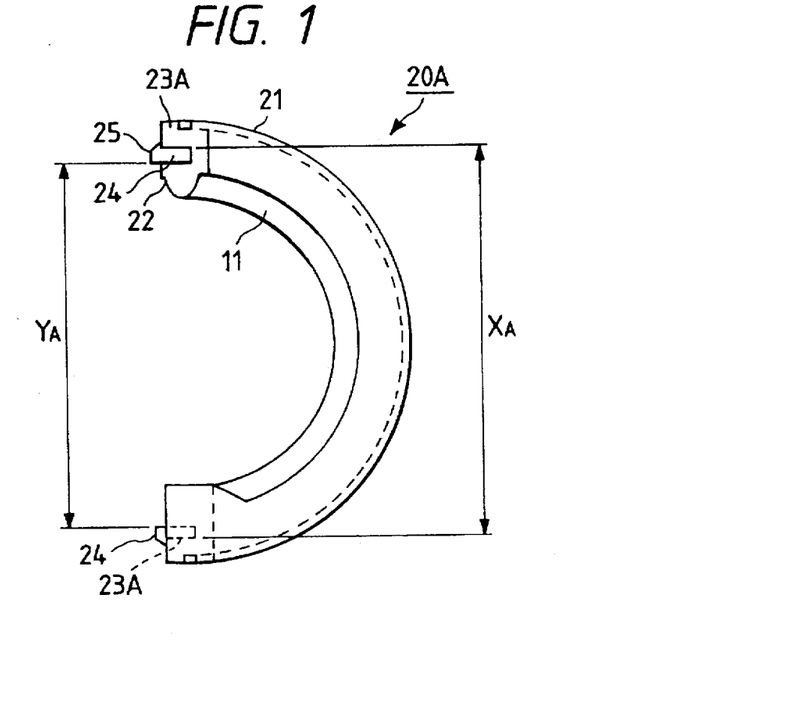
FIG. 1 is a front view showing one of two segments of a seal member according to a first embodiment of the present invention.
Figure 2:
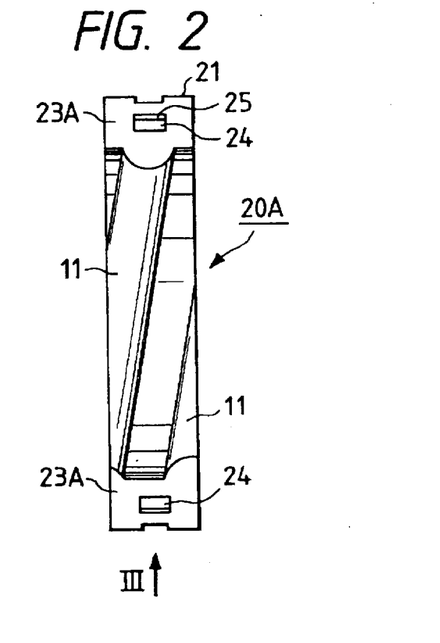
FIG. 2 is a side view of FIG. 1.

The construction of the seal member of the present invention is first described. The annular seal member 20 is formed of two segments 20A and 20B. As shown in FIGS. 1 and 2, the first segment 20A is semicircular and includes the outer circumference 21 which is fitted into the large-diameter portion 5 of a ball screw nut 2 at either end of its opening and the inner circumference 22 which has a ridge 11 that engages the screw groove 1b on the screw shaft 1.

Figure 3:
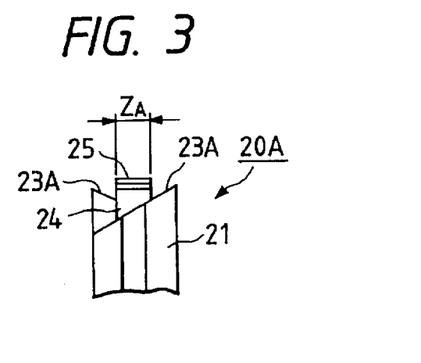
FIG. 3 is a partial view of FIG. 2 as being taken in the direction indicated by arrow III.
Figure 4:
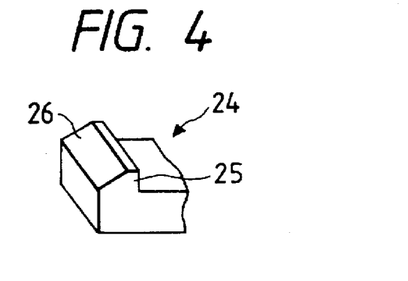
FIG. 4 is a perspective view showing an end portion of each of connecting projections shown in FIG. 1.

Both end faces 23A of the segment 20A are formed to incline in the axial direction of the annular seal member 20 and in directions opposite to each other see FIG. 3). The central part of each end face 23A is provided with one connecting projection 24 that extends in a circumferential direction. The connecting projections 24 each have a hook-shaped rib 25 at the end, the rib serving as an anti-slip device to be used in the present invention (see FIG. 4).

The second segment 20B of the seal member 20 of the present invention has substantially the same shape and size as the first segment 20A, except that both end faces 23B are provided with a connecting recess 28 in correspondence to the connecting projection 24.

The connecting recess 28 is formed as a horizontal cavity that extends inwardly from the end face 23B in the circumferential direction by a depth which is substantially the same as the length of the corresponding connecting projection 24. The connecting recess 28 terminates with a vertical cavity 30 also serving as the anti-slip device. The vertical cavity 30 extends outwardly at a right angle to communicate with an opening 29 in the outer circumference (see FIG. 5).

The connecting projection 24 provided at both end faces 23A of the first segment 20A have the following dimensions as relative to the connecting recesses 28 provided at both end faces 23B of the second segment 20B. A maximal facial distance $X_A$ which is the distance between the outer surfaces of the connecting projections 24 (see FIG. 1) is adjusted to be slightly greater than a maximal facial distance $X_B$ which is the distance between the outer surfaces of the connecting recesses 28 (see FIG. 6); thus $X_A > X_B$. The widthwise dimension $Z_A$ of each connecting projection 24 (see FIG. 3) is adjusted to be slightly greater than the widthwise dimension $Z_B$ of each connecting recess 28 (see FIG. 7); thus, $Z_A > Z_B$. These dimensional relationships are selected to insure that there is no rattling after the connecting projections 24 are inserted into the corresponding recesses 28.

On the other hand, a minimal facial distance $Y_A$ which is the distance between the inner surfaces of the connecting projections 24 (see FIG. 1) is adjusted to be slightly greater than a minimal facial distance $Y_B$ which is the distance between the inner surfaces of the connecting recesses 28 (see FIG. 6); thus $Y_A > Y_B$. This dimensional relationship is selected to insure an allowance by which the inserted connecting projection 24 is deformed elastically so that it can be disengaged from the mating recess 28.

The two semicircular segments 20A and 20B are joined together by connecting their respective end faces 23A and 23B, so that a single seal member 20 is completely formed as shown in FIGS. 8–10.

The operation of the seal member of the present invention will now be described. The two semicircular segments 20A and 20B are carried to the vicinity of a ball screw nut 2 in threadable engagement with the screw shaft 1, and hold the shaft 1 such that the ridge 11 on each segment engages the screw groove 1b on the shaft. At the same time, the connecting portion 24 at both end faces 23A of the first segment 20A are inserted into the corresponding recesses 28 at both end faces 23B of the second segment 20B until the end faces 23A come into close contact with the mating end faces 23B so that they are joined together. To insert the connecting projections 24, the hook-shaped rib 25 at either end of the segment 20A is forcibly pushed into the recess 28 in the second mating segment 20B with a slope 26 (see FIG. 4) being held in contact with an inner edge of the recess 28. Due to the action of the slope 26, the rib 25 is compressed in the inside radial direction, whereupon the projection 24 deforms elastically to flex somewhat inwardly and the hook-shaped rib 25 is slid into the recess 28 to achieve complete engagement with the recess 28. In this state, the end of the hook-shaped rib 25 on the connecting projection 24 which serves as the first anti-slip device engages the second anti-slip device (vertical cavity 30) as shown in FIG. 11, whereby the two segments 20A and 20B are firmly secured to each other to complete a single annular seal member 20.

Thereafter, the annular seal member 20 is turned around the screw shaft 1 until it is fitted into the large-diameter portion 5 of the ball screw nut 2 at an end. Finally, the seal member 20 is fixed to the nut 2 by setscrews 8.

According to the first embodiment, the seal member 20 can be mounted on the ball screw nut 2 within a very short time irrespective of whether the ends of the screw shaft 1 are cut to form a perpendicularly cut end portion 9A or to form a rising cut end portion 9B and independently of the length of the shaft 1. In addition, there is neither need to provide a slit in the seal member 20 as in the conventional member, nor to increase the diameter of the seal member by twisting at the slit with its elasticity. Hence, the seal member of the present invention for use in ball screw apparatus can be produced at low cost using a material selection from a wide range of choices.

Figure 11:
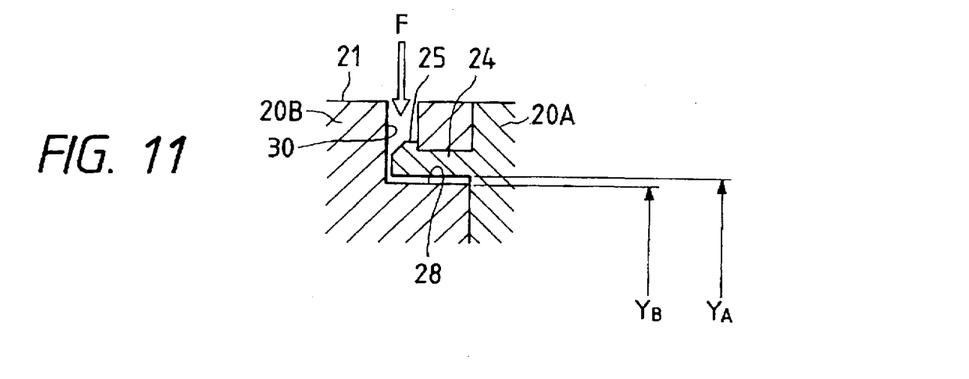
FIG. 11 is a section XI—XI of FIG. 9.
Figure 12:
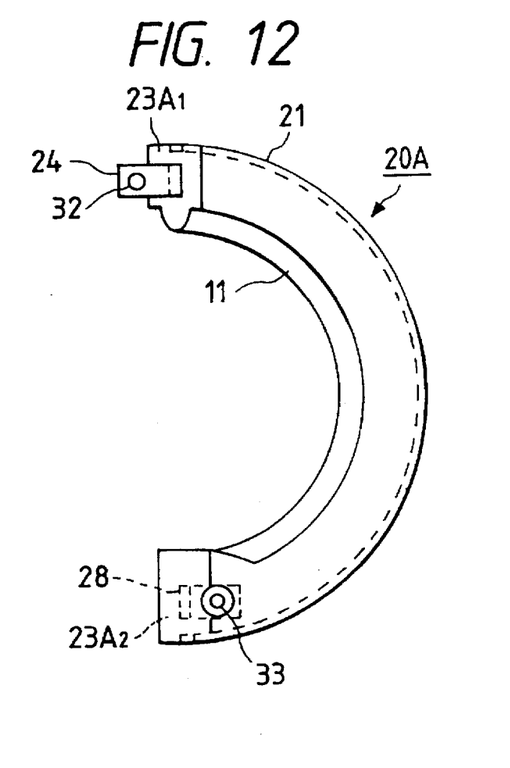
FIG. 12 is a front view showing one of two segments of a seal member according to a second embodiment of the present invention.
Figure 13:
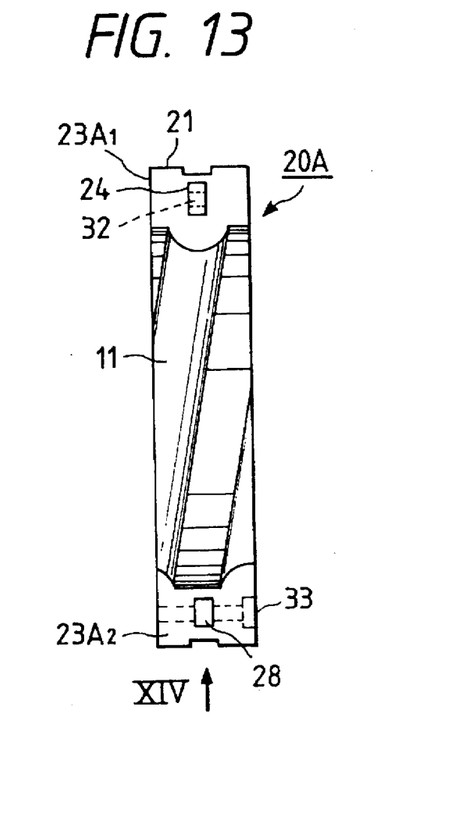
FIG. 13 is a side view of FIG. 12.
Figure 14:
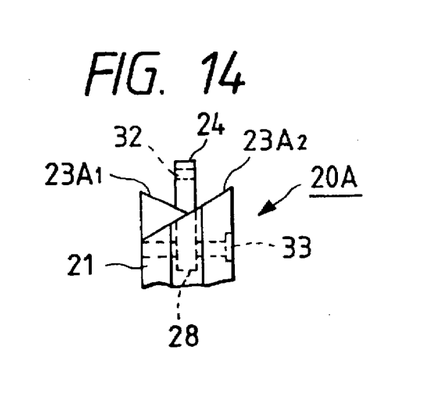
FIG. 14 is a partial view of FIG. 13 as being taken in the direction indicated by arrow XIV.
Figure 15:
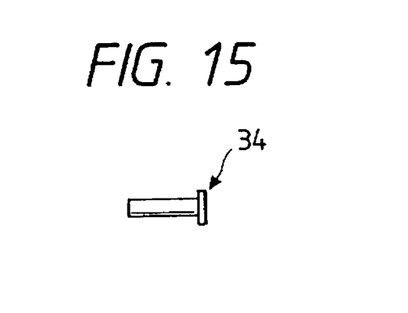
FIG. 15 is a side view of an anti-slip pin.

In order to remove the annular seal member 20 from the screw shaft 1, a rod may be inserted into the vertical cavity 30 which is opened in the outer circumference 21 so that a force F is applied to press down the hook-shaped rib 25 (see FIG. 11). As a result, the end portion of the first segment 20A is elastically deformed to move somewhat inwardly, whereupon the hook-shaped rib 25 and the vertical cavity 30 serving as the anti-slip device disengage from each other. Therefore, the connecting projection 24 can be readily pulled out of the mating recess 28.

FIGS. 12-17 show a second embodiment of the present invention. The first semicircular segment 20A is provided with a connecting projection 24 on one end face 23A$_1$ (the upper end face in FIG. 12) and a connecting recess 28 on the other end face 23A$_2$ (the lower end face in FIG. 12). Two pin insertion holes 32 and 33 serves as the first anti-slip device in which the hole 32 penetrates the lateral sides of the projection 24 and the hole 33 crosses the recess 28 to penetrate the lateral sides of the segment 20A in areas near the other end face 23A$_2$; a pin 34 (see FIG. 15) serving as the second anti-slip device is inserted through the holes 32 and 33. The connecting projection 24 and the corresponding recess 28 provided in the second embodiment are rectangular and have a shape and dimensions slightly different from those provided on the first embodiment.

Figure 16:
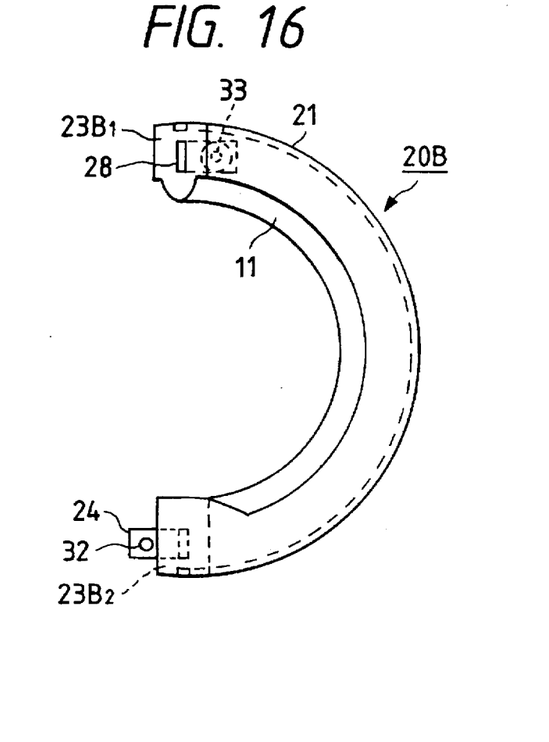
FIG. 16 is a front view showing the other segment of the seal member according to the second embodiment of the present invention.
Figure 17:
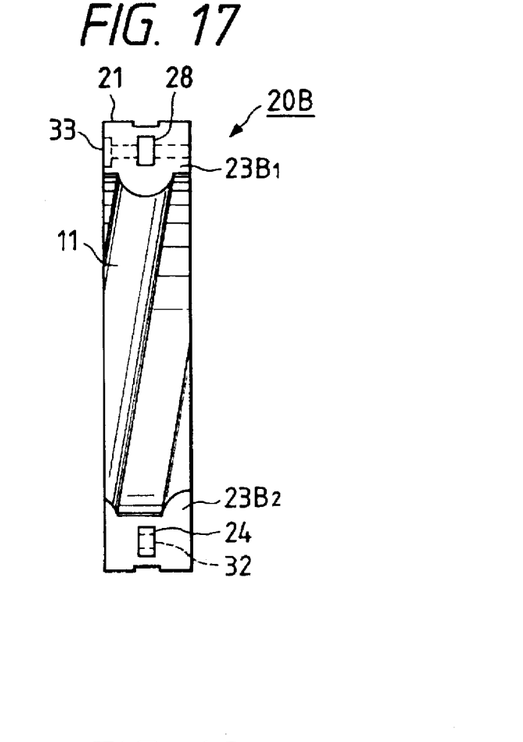
FIG. 17 is a side view of FIG. 16.
Figure 18:
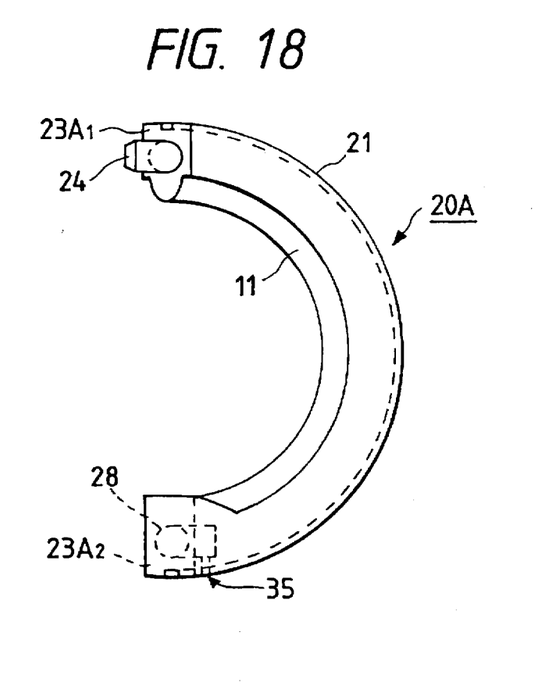
FIG. 18 is a front view showing one of two segments of a seal member according to a third embodiment of the present invention.
Figure 19:
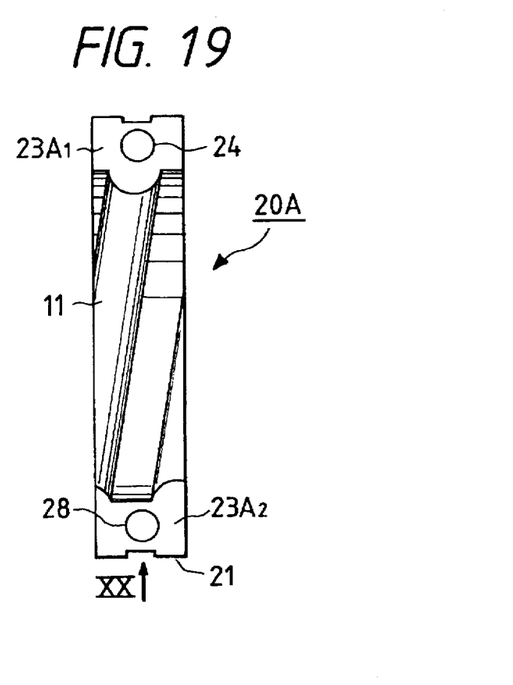
FIG. 19 is a side view of FIG. 18.
Figure 20:
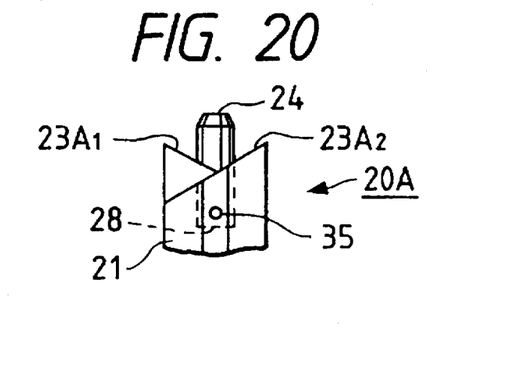
FIG. 20 is a partial view of FIG. 19 as being taken in the direction indicated by arrow XX.
Figure 21:
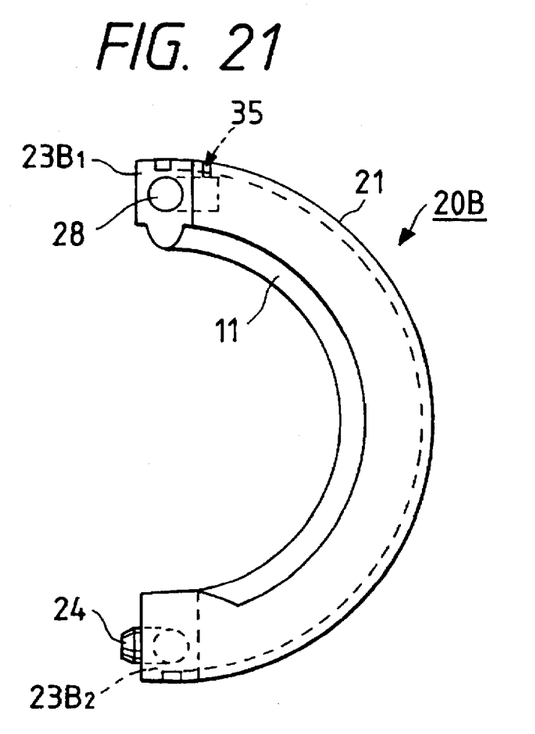
FIG. 21 is a front view showing the other segment of the seal member according to the third embodiment of the present invention.
Figure 22:
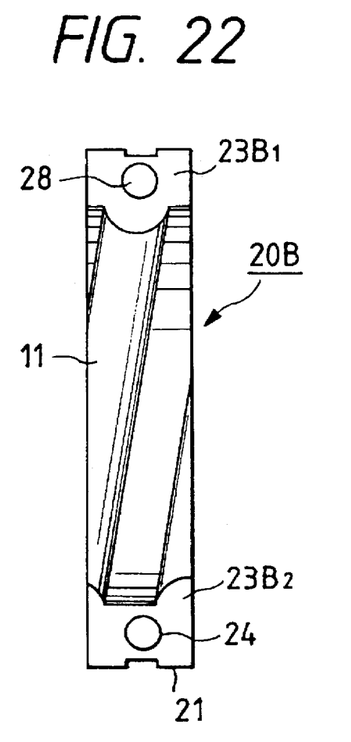
FIG. 22 is a side view of FIG. 21.

The second semicircular segment 20B is provided with the connecting projection 24, connecting recess 28, and pin insertion holes 32 and 33 in such a way that their positions are inverted to those for the first semicircular segment 20A as shown in FIGS. 16 and 17.

The components shown in FIGS. 12-17 are assembled in the following way. First, the connecting projection 24 on the end face 23A$_1$ of the first semicircular segment 20A is inserted into the corresponding recess 28 in the end face 23B$_1$ of the second semicircular segment 20B to achieve close contact between both the end faces 23A$_1$ and 23B$_1$. Thereafter, the pin 34 is inserted through the holes 32 and 33 to insure that the projection 24 does not slip out of the mating recess 28. The other end face 23A$_2$ of the first semicircular segment 20A is similarly brought into contact with the other end face 23B$_2$ of the second semicircular segment 20B and a pin 34 is also inserted through the holes 32 and 33 to insure that the projection 24 does not slip out of the mating recess 28. Further, a tightening allowance is provided between the pin 34 and each of the pin insertion holes 32 and 33 as the anti-slip device in order to insure that no rattling occurs after the two segments 20A and 20B have been assembled together.

The second embodiment described above has the advantage that each of the segments 20A and 20B can be made of a completely inelastic material. For the other features of its construction, operation and advantageous effects, the second embodiment is essentially the same as the first embodiment.

FIGS. 18-22 show a third embodiment of the present invention. The third embodiment differs from the first and second embodiments in the following two points. First, the connecting projection 24 and the corresponding recess 28 are circular in cross section, rather than angular. Secondarily, the anti-slip device provides the connecting projection 24 having such dimensions as to be press-fitted into the mating recess 28 to achieve engagement with the mating recess 28 instead of the pin and the pin insertion holes. Further, an air venthole 35 is provided at the terminating end of the recess 28 to ensure that the projection 24 can be smoothly press-fitted into the recess 28. For the other features of its construction, operation and advantageous effects, the third embodiment is essentially the same as the second embodiment.

In the three embodiments described above, the seal member is formed of two segments which are assembled into an annular shape; however, the number of segments may be three or more although the use of two segments is desirable from the viewpoint of ease with which the segments can be assembled into a complete seal member.

As described above, the seal member of the present invention for use in a ball screw apparatus is such that an annular preform is divided circumferentially into a plurality of segments, which are assembled together into an annular body by detachably connecting a projection on one end face of a segment to a mating recess on one end face of an adjacent segment with the anti-slip device. Therefore, the seal member can be mounted in a ball screw nut within a short time regardless of the length of a screw shaft and the shape of its end portions and, in addition, there is no need to apply a special operation such as slitting an annular seal member and cutting it open to facilitate its mounting in the ball screw nut. What is more, the seal member of the present invention provides a great latitude in the choice of suitable materials and, hence, it has high operational efficiency and can be manufactured at low cost.

It the second or third embodiment of the present invention, the connecting projection on one segment is joined to the mating recess in an adjacent segment with pinning or press fitting being adopted as the anti-slip device; this eliminates the need to utilize elasticity in connecting or disconnecting the segments of an annular body, thereby offering the added advantage that seal member can be formed of less elastic materials.

What is claimed is:

1. A ball screw apparatus comprising:

a screw shaft including a first screw groove on its outer circumference;

a ball screw nut including a large-diameter portion which is formed at an opening end and a second screw groove on its inner circumference which corresponds to the first screw groove;

a plurality of balls rolling within a helical space formed between the first and the second screw grooves; and a seal member comprising a ring which is fitted into the large-diameter portion and a ridge which is engagable with the first screw groove, the ring being formed of a first segment and a second segment, the first segment including a connection projection at an end, the second segment including a connecting recess at an end, the connecting projection of the first segment being capable of engaging the connecting recess of the second element;

wherein each of the first and the second segments includes end faces which are formed to incline in an axial direction of the ring and in directions opposite to each other.

2. The ball screw apparatus of claim 1, wherein the connecting projection and the connecting recess comprise circular shapes in cross section, the connecting projection having such dimensions as to be press-fitted into the connecting recess at a central part between the respective end faces.

3. The ball screw apparatus of claim 1, wherein the connecting projection extends in a circumferential direction of the ring at a central part between the end faces, the connecting projection comprising a hook-shaped rib at its end.

4. The ball screw apparatus of claim 3, wherein the connecting recess comprises a first cavity that extends inwardly from a central part between the end faces in the circumferential direction by a depth which is substantially the same as a length of the connecting projection.

5. The ball screw apparatus of claim 4, wherein the second segment includes an opening in an outer circumference near the connecting recess and a second cavity which extends outwardly at a right angle to the outer circumference for communicating with the opening, the connecting recess terminating with the second cavity.

6. The ball screw apparatus of claim 1, wherein the first segment includes connecting projections at both ends and the second segment includes connecting recesses at both ends, the ring having such dimensions that a first distance between outer surfaces of the connecting projections is slightly greater than a second distance between outer surfaces of the connecting recesses.

7. The ball screw apparatus of claim 1, wherein the ring has such dimensions that a first widthwise dimension of the connecting projection is slightly greater than a second widthwise dimension of the connecting recess.

8. The ball screw apparatus of claim 1, wherein the first segment includes connecting projections at both ends and the second segment includes connecting recesses at both ends, the ring having such dimensions that a first distance between inner surfaces of the connecting projections is slightly greater than a second distance between inner surfaces of the connecting recesses.

9. The ball screw apparatus of claim 5, wherein the connecting projection of the first segment disengages the connecting recess of the second segment by applying a force to the hook-shaped rib engaged in the second cavity from the opening.

10. The ball screw apparatus of claim 1, wherein the ring includes a pin for ensuring that the connecting projection of the first segment engages the connecting recess of the second segment at a central part between the respective end faces, the connecting projection including a first pin insertion hole which penetrates lateral sides of the connecting projection, the connecting recess including a second pin insertion hole which crosses the connecting recess to penetrate lateral sides of the respective segments near the connecting recess.

11. The ball screw apparatus of claim 10, wherein the connecting projection and the connecting recess comprise rectangular shapes.

12. The ball screw apparatus of claim 1, wherein the ring is formed of a plurality of circumferential segments.

13. The ball screw apparatus of claim 1, wherein each of the first and the second segments includes a connecting projection and a connecting recess at respective ends, the connecting projection and the connecting recess of the first segment engaging the connecting recess and the connecting projection of the second segment, respectively.

14. The ball screw apparatus of claim 13, wherein the ring has such dimensions that a first distance between outer surfaces of the connecting projection of the first segment and the connecting projection of the second segment is slightly greater than a second distance between outer surfaces of the connecting recess of the first segment and the connecting recess of the second segment.

15. The ball screw apparatus of claim 13, wherein the ring has such dimensions that a first distance between inner surfaces of the connecting projection of the first segment and the connecting projection of the second segment is slightly greater than a second distance between inner surfaces of the connecting recess of the first segment and the connecting recess of the second segment.

* * * * *